(12) United States Patent
Konishi

(10) Patent No.: US 8,054,927 B2
(45) Date of Patent: Nov. 8, 2011

(54) SYNCHRONOUS CIRCUIT AND METHOD FOR RECEIVING DATA

(75) Inventor: Shinya Konishi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 648 days.

(21) Appl. No.: 12/219,522

(22) Filed: Jul. 23, 2008

(65) Prior Publication Data
US 2009/0034671 A1 Feb. 5, 2009

(30) Foreign Application Priority Data
Jul. 31, 2007 (JP) .................................. 2007-198354

(51) Int. Cl.
*H04L 7/00* (2006.01)
(52) U.S. Cl. ........ 375/355; 375/371; 375/354; 375/322; 375/360; 375/366; 370/480; 370/506; 370/522
(58) Field of Classification Search .................. 375/355, 375/354, 322, 366, 360; 370/480, 503, 506, 370/522
See application file for complete search history.

(56) References Cited

U.S. PATENT DOCUMENTS

| | | | | |
|---|---|---|---|---|
| 5,757,869 A * | 5/1998 | Sands et al. | ................... | 375/366 |
| 5,812,607 A * | 9/1998 | Hutchinson et al. | .......... | 375/322 |
| 5,928,293 A * | 7/1999 | Jobling et al. | ..................... | 701/2 |
| 6,278,755 B1 * | 8/2001 | Baba et al. | ..................... | 375/360 |
| 6,813,325 B1 * | 11/2004 | Lin | ................ | 375/354 |
| 7,116,735 B2 * | 10/2006 | Yamada et al. | ................ | 375/354 |
| 7,620,072 B2 * | 11/2009 | Kihara | ......................... | 370/480 |
| 2002/0140867 A1 * | 10/2002 | Weiss | ............................ | 348/723 |
| 2003/0210756 A1 * | 11/2003 | Ito | ................................ | 375/354 |

FOREIGN PATENT DOCUMENTS
JP 2003-333020 11/2003
* cited by examiner

*Primary Examiner* — Eva Puente
(74) *Attorney, Agent, or Firm* — McGinn IP Law Group, PLLC

(57) ABSTRACT

The present invention includes: a synchronous-word detecting unit receives a baseband received signal including a synchronous word and data for each frame, and detects whether or not the synchronous word is coincided with an expected value in the baseband received signal by using an N-(N is an integer of 2 or larger) phase sampling clock; a phase information retaining unit retains phase information accumulatively including results detected for a plurality of frames by the synchronous-word detecting unit, and determines a phase to be sampled on the basis of the retained phase information; a phase selecting unit selects and determines a phase of the sampling clock on the basis of determination by the phase information retaining unit; and a FIFO buffer samples the data from the baseband received signal, and outputs the sampled data.

12 Claims, 9 Drawing Sheets

FIG. 4

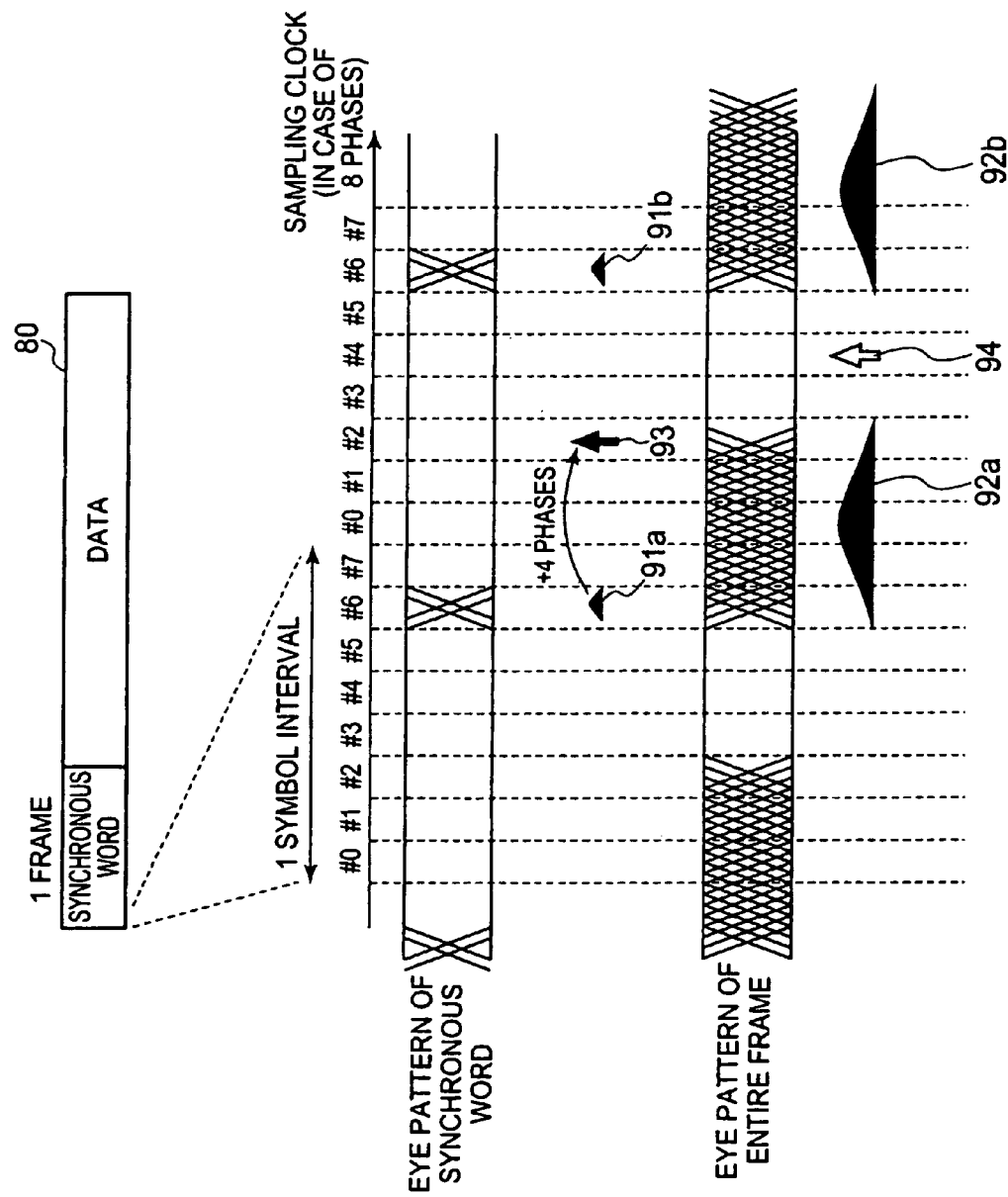

and outputting sampled data from the baseband received signal.

SYNCHRONOUS CIRCUIT AND METHOD FOR RECEIVING DATA

BACKGROUND OF THE INVENTION

1. Field of the Invention

The present invention relates to a method for receiving data in the high-speed synchronous communication among LSIs.

2. Description of the Related Art

Heretofore, in wireless communication systems, techniques have been developed to optimize a timing to sample data from a baseband received signal. For example, Japanese Patent Application Publication No. 2003-333020 discloses a receiving circuit for a baseband received signal which properly restores a symbol in the baseband received signal (serial signal). One example of this technique is based on the Bluetooth standard with a synchronous word of 64 bits. In other words, the receiving circuit determines the optimum phase on the basis of a detection result of each of the 64-bit synchronous words.

FIG. 8 is a schematic block diagram showing a configuration example of the conventional synchronous circuit. A baseband signal is sampled in a synchronous-word detection circuit 7p with frequency equal to an m-fold (m is an integer of 2 or larger) transmission rate. Here, the synchronous words are added to the head of the baseband signal. In other words, the synchronous-word detection circuit 7p compares the synchronous word included in each of m phases (1 symbol) of the baseband signal with the expected value. Then, one of the m phases including the largest number of the bits coinciding with the expected value is transmitted as the optimum phase to the frequency drift correcting circuit 5p. A FIFO buffer 6p uses this optimum phase to output a stable received symbol to the internal circuit. Thus, the synchronous-word detection circuit 7p detects the optimum phase on the basis of how many symbols in the synchronous word coincide with the expected value.

The accuracy in the optimum phase detection can be improved by setting a range in the frame for a phase comparison to be as broad as possible. Accordingly, the technique disclosed in Japanese Patent Application Publication No. 2003-333020 is effective means in the case where the frame includes a high ratio of the synchronous words, or the synchronous words are disposed dispersedly in the frame.

However, when the synchronous word is added to the top of the baseband signal, incorrect data may be retained at the optimum phase which is determined on the basis of how many symbols in the synchronous words coincide with the expected value. This is because the center phase is shifted while the subsequent data such as payload is being received. It can be considered that this tendency is observed more often when, in particular, the bit number of the synchronous words at the header portion is small and a data length is long.

FIG. 9 is a diagram showing the conventional technique in which a sampling clock is selected from the jitter component of a frame. In FIG. 9, the baseband signals are sampled with the frequency that is 8 times as much as the transmission rate. In other words, each phase is shown as #0 to #7 by using the sampling clock of 8 phases per symbol. In addition, in FIG. 9, the conventional technique is based on a frame standard in which: a synchronous word with a small bit-width is added to a frame header portion; and the data length (payload data length) is long. Here, the jitter component at a symbol boundary of the synchronous word is assumed to occur in the phase #6, which is shown by the reference numerals 91a and 91b. The jitter component of the entire frame including data is spread wider than the jitter component detected in the synchronous word detection, and the jitter components occur in the phases #6, #7, #0, #1, and #2, which are shown by 92a and 92b. If coincidence between the synchronous word and the expected value is not detected only in the phase of #6 due to the jitter component, the most remote phase from the phase of #6, for example, the phase of #2 that is positioned 4 phases away therefrom (the arrow 93) is determined as a sampling clock suitable for the later data detection. On the other hand, when the entire frame is taken into consideration, the jitter components are so widely spread that incorrect data may be retained over the 5 phases of #6, #7, #0, #1 and #2. At this time, the phase (phase #2) determined as the optimum phase by the synchronous word detection may be determined as a boundary of the symbol when viewed as the entire frame, and this may cause incorrect data to be retained. For this reason, the phase selection needs to be made in consideration of how the jitter components are spread in the entire frame. In the case of FIG. 9, the phase #4 shown by the arrow 94 is a phase to be really obtained.

As shown in FIG. 9 as an example, in the prior art, the sampling clock (the phase #2 shown by the arrow 93) is determined based on a part of the jitter components (the reference numeral 91a, 91b). As a result, the optimum phase (the phase #4 shown by the arrow 94) based on the jitter components (the reference numeral 92a, 92b) of the entire frame fails to be selected. Accordingly, occurrence frequency of such a phenomenon that an incorrect phase is selected as the optimum phase is expected to increase when the bit number of the synchronous word of the header portion in one frame is small and the data length of the frame is long, i.e., when the ratio of the synchronous word to the frame is low. In addition, along with speeding-up of a transmission rate in recent years, the occurrence frequency is also expected to increase due to the growing ratio of jitter components per symbol.

As described above, there has been a need to improve accuracy of data sampling even when the ratio of synchronous words to a frame is low.

SUMMARY

An embodiment of a synchronous circuit according to the present invention includes: a synchronous-word detecting unit which receives a baseband received signal including a synchronous word and data for each frame, and which detects the presence or absence of coincidence between the synchronous word and an expected value in the baseband received signal by using an N-(N is an integer of 2 or larger) phase sampling clock; a phase information retaining unit which retains phase information accumulatively including results detected for a plurality of frames by the synchronous-word detecting unit, and which determines a phase to be sampled on the basis of the retained phase information; a phase selecting unit which selects and determines a phase of the sampling clock on the basis of determination by the phase information retaining unit; and a FIFO buffer which samples the data from the baseband received signal, and outputs the sampled data.

In addition, an embodiment of a method for receiving data according to the present invention includes: receiving a baseband received signal including a synchronous word and data for each frame; detecting the presence or absence of coincidence between a synchronous word and an expected value in the baseband received signal by using an N-(N is an integer of 2 or larger) phase sampling clock; retaining, in a recording area, phase information accumulatively including results detected for a plurality of frames; selecting a phase to be sampled on the basis of the retained phase information; and sampling the data from the baseband received signal at the selected phase, and outputting the sampled data.

According to the present invention, accuracy of data sampling can be improved even when the percentage of synchronous words existing in a frame is low. Thus, the bit error rate can be reduced.

BRIEF DESCRIPTION OF THE DRAWINGS

FIG. 4 is a timing chart showing an example of operation of a synchronous-word detecting unit of the synchronous circuit in the case of counting up the count of the phase in which coincidence with the expected value is not detected.

FIG. 9 is a diagram showing a relationship between a frame and a jitter component in the prior art.

DESCRIPTION OF THE PREFERRED EMBODIMENTS

Figure 1:
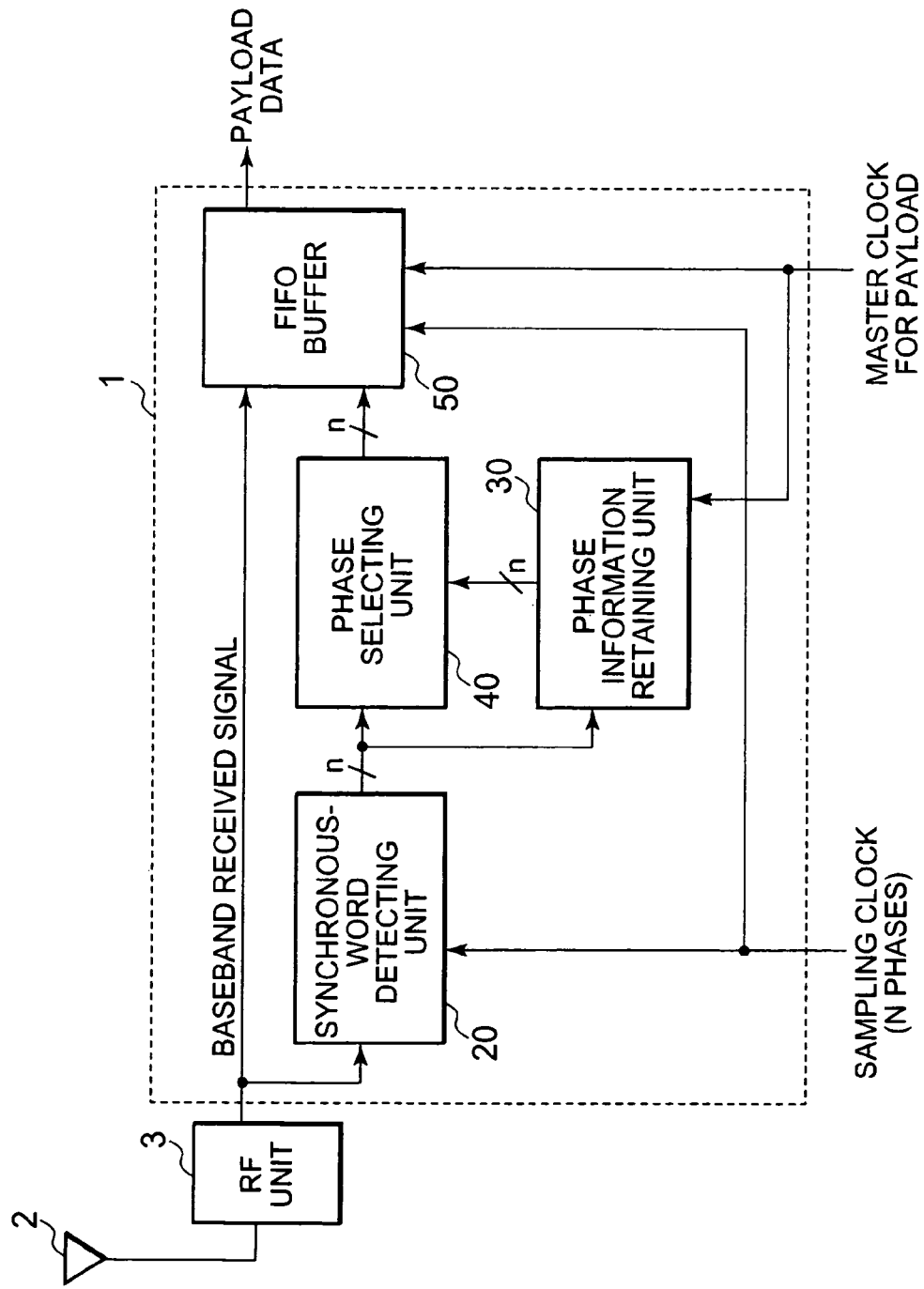
FIG. 1 is a diagram showing an example of a synchronous circuit according to the present invention.

Hereinafter, embodiments of the present invention will be explained with reference to the accompanying drawings. In order to clarify the explanation, the following description and drawings are abbreviated and simplified as appropriate. In each of the drawings, the same reference numerals are given to the components and the corresponding portions having the same configuration or function, whose explanation will be omitted.

Embodiment 1

FIG. 1 is a diagram showing an example of a synchronous circuit according to the present invention. A synchronous circuit 1 receives a baseband received signal. The baseband received signal is a signal obtained by processing a received signal that an RF (Radio Frequency) unit 3 has received from an antenna 2. The synchronous circuit 1 and the RF circuit 3 refer to the same reference clock to synchronize. Each of the synchronous circuit 1 and the RF circuit 3 has a PLL (Phase Locked Loop), replaces the clock with a high frequency clock, and performs transmission and reception of data.

The synchronous circuit 1 as shown in FIG. 1 includes a synchronous-word detecting unit 20, a phase information retaining unit 30, a phase selecting unit 40, and a FIFO (First-in-First-out) buffer 50. The synchronous circuit 1 includes the following functions: (1) to receive a baseband received signal so as to retain the synchronous-word detection result in multiple frames by using N-(N is an integer of 2 or larger) phase sampling clock; (2) to determine a phase to be sampled on the basis of a detection result of the retained sync word; and (3) to output data on the basis of a determined result.

Here, the baseband received signal is formed of multiple frames, one of which includes a synchronous-word area and a data area. In the synchronous-word area, predetermined data is set. In the data area, data to be transmitted is set. Additionally, in the present specification, it is assumed that one symbol corresponds to one bit.

The sampling clock uses a clock that samples the baseband received signal with N-fold (N is an integer of 2 or larger) cycles of the symbol speed. In other words, the sampling clock uses a clock of N phases spaced by 1/N of a symbol. In the following description, each of the phases in the N-phase sampling clock of will be shown as #0 to #(N−1).

The synchronous-word detecting unit 20 detects a degree of coincidence with a synchronous word included in the frame, and outputs the detection result to the phase information retaining unit 30 and the phase selecting unit 40. To be concrete, the synchronous-word detecting unit 20 detects the degree of coincidence with a sync word by using the N-phase sampling clock from the baseband received signal. The value of N is determined arbitrarily.

The phase information retaining unit 30 accumulates results detected by the synchronous-word detecting unit 20 for multiple frames. Each of the detected results accumulated for multiple frames is hereinafter referred to as phase information. The phase information retaining unit 30 determines a phase to be sampled on the basis of phase information, and outputs the determined phase to the phase selecting unit 40. A method for determining a phase to be sampled will be described later. In addition, the phase information retaining unit 30 has a counter for retaining the phase information.

The phase selecting unit 40 selects a phase to be sampled on the basis of a phase outputted by the phase information retaining unit 30. In addition, the phase selecting unit 40 occasionally selects the phase to be sampled on the basis of each detected result outputted by the synchronous-word detecting unit 20. The phase selecting unit 40 outputs the selected phase to the FIFO buffer 50.

The FIFO buffer 50 samples data from a data area included in the baseband received signal of the phase selected by the phase selecting unit 40, and outputs the sampled data. The outputted data is used in an internal circuit (data processing unit) and the like for processing data.

Figure 2:
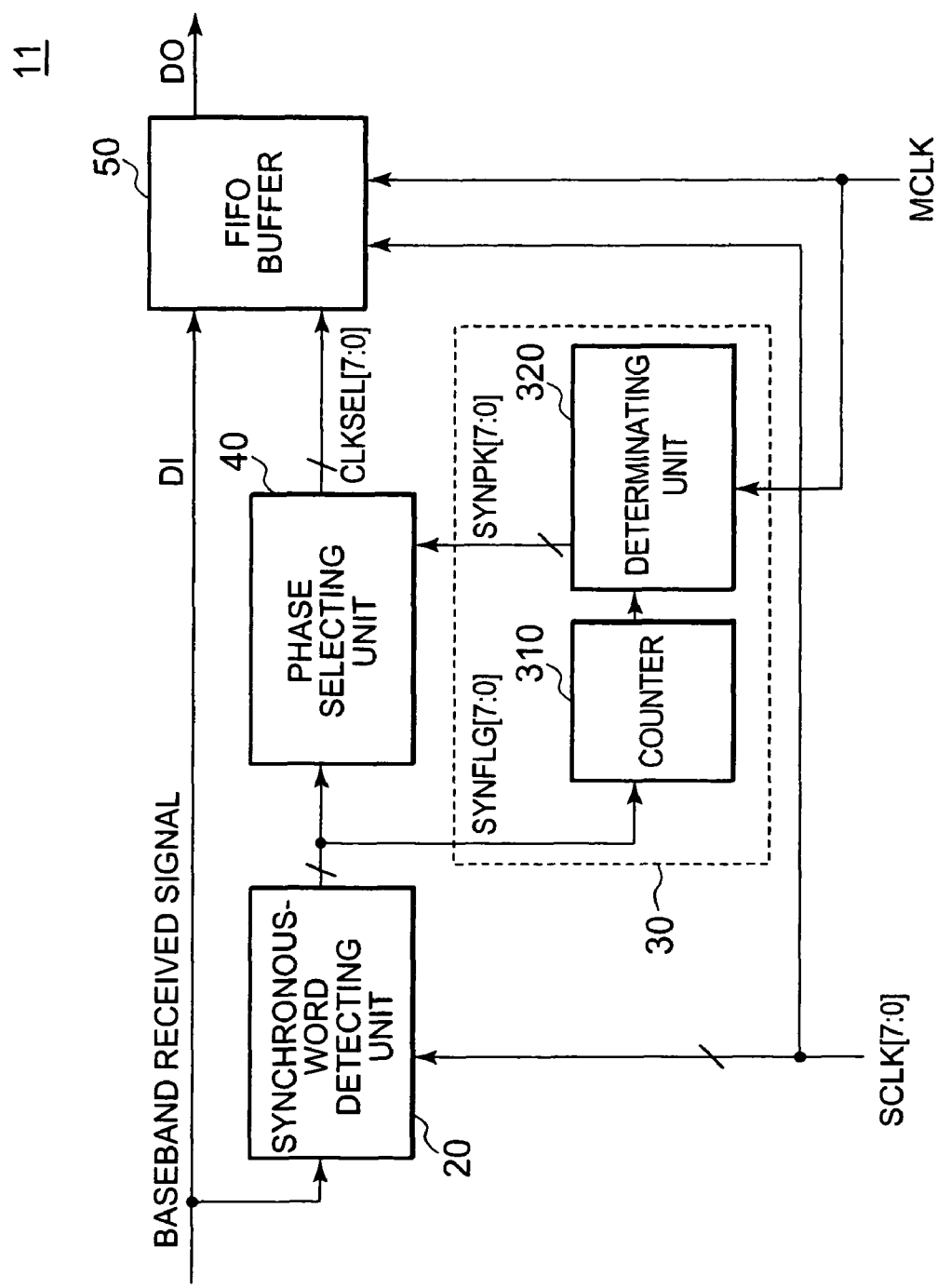
FIG. 2 is a block diagram showing an example of a configuration to which the synchronous circuit shown in FIG. 1 is applied when sampling is performed with 8 sampling clocks per symbol.

Next, the phase information retaining unit 30 will be described in detail. Here, with reference to FIG. 2, described is a configuration example in which the synchronous circuit 1 is applied when a sampling clock of N=8 is used. FIG. 2 is a block diagram showing a configuration example, which is applied when the synchronous circuit 1 shown in FIG. 1 is sampled with the 8 sampling clocks per symbol.

A synchronous circuit 11 includes a counter 310 and a determinating unit 320. SCLK is a sampling clock of 8 phases, and MCLK is a master clock for payload. The counter 310 is provided with a record area for counting N values (N is the number of phases to be sampled). The counter 310 counts either of the number of times that the synchronous-word detecting unit 20 detected coincidence between the synchronous word and the expected value, or the number of times that the synchronous-word detecting unit 20 does detect such coincidence. The counter 310 counts the detected result that the synchronous-word detecting unit 20 detects for multiple frames.

In this manner, the counter 310 retains phase information accumulating a detected result of multiple frames by counting (adding) the detected result. In addition, the counter 310 has a function to perform a constant division (bit shift) on counter values of all the phases prior to overflow. With this function, measurement of the largest count number is continued without the count values of each phase not being reset completely. Incidentally, it is assumed that an execution cycle of the division and a shift amount are determined corresponding to fluctuation of jitter. Thus, the counter 310 is to count the detected result of multiple frames, by which a state of propagation channel in the multiple frames can be found. In addition, it can also be said that the counter 310 is a recording area for having phase information recorded.

The determinating unit 320 determines a phase to be sampled on the basis of a value that the counter 310 counted up. To be specific, the determinating unit 320 determines, as a phase to be sampled, a normal phase in which the coincidence between the synchronous word and the expected value in the multiple frames is detected the largest number of times. Further in multiple phases, the design is made so that each normal phase can be detected; thus, the determinating unit 320 can determine the phase to be sampled, with the multiple detected normal phases, by the following method.

As a first method, the determinating unit 320 determines, as a phase to be sampled, a central phase among multiple phases. As a second method, the determinating unit 320 determines, as a phase to be sampled, a phase remote from a defective phase (an incorrect phase) including the largest number of frames where coincidence between the synchronous word and the expected value is not detected.

In the first method, when multiple phases (for example, 2 phases) become candidates for phases to be sampled, the phase to be sampled may be determined with the simultaneous use of the second method. Additionally in the second method, the phase most remote from a defective phase may be determined as a phase to be sampled.

Figure 3:
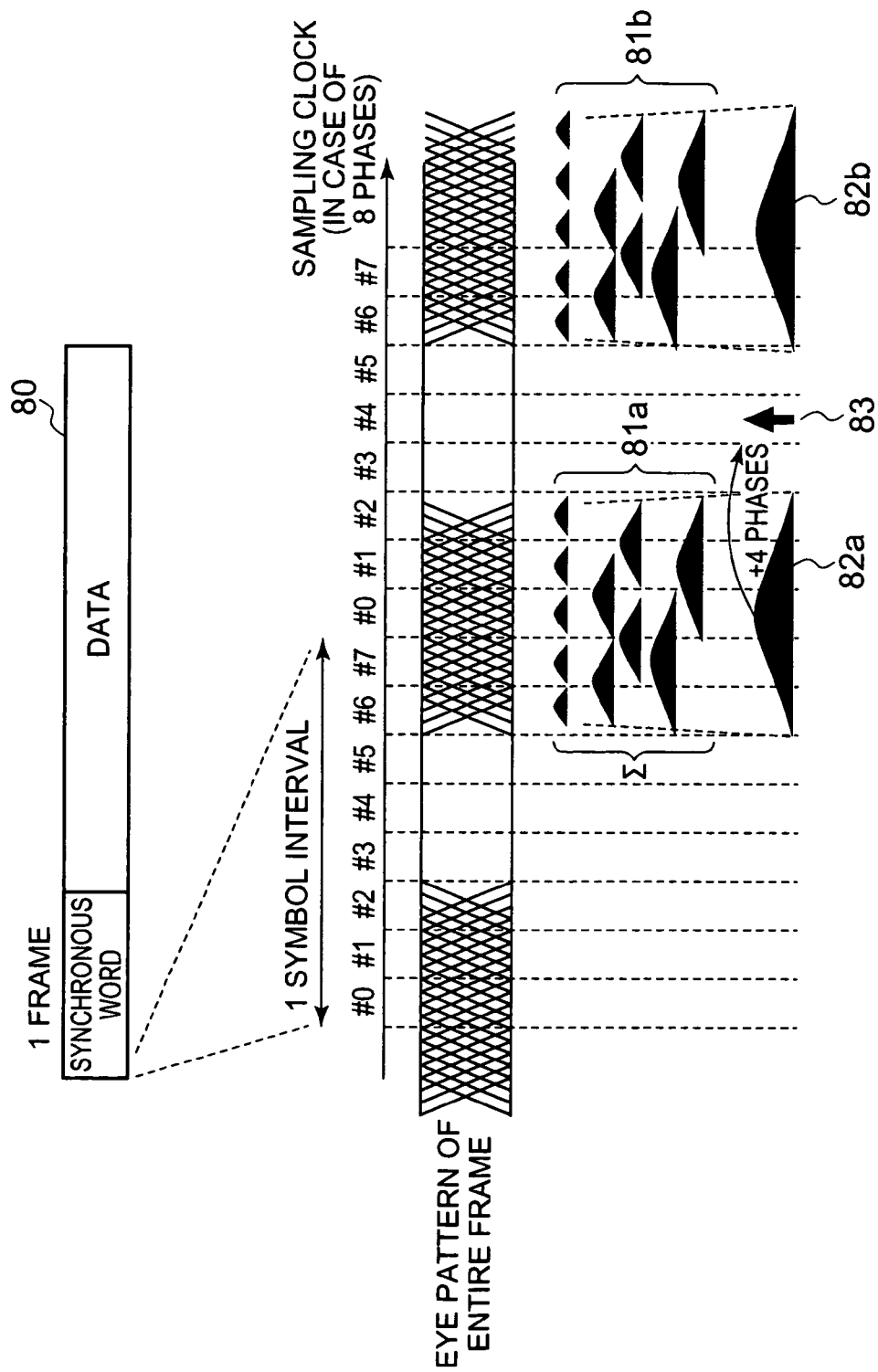
FIG. 3 is a diagram showing a relationship between a frame and jitter component of Embodiment 1.

With reference to FIG. 3, a relationship between a frame of the present embodiment and jitter components will be explained. FIG. 3 is a diagram showing a relationship between a frame and jitter components in case of using a sampling clock of 8 phases per symbol. In FIG. 3, as in FIG. 9, considered is a case where sampling clock of 8 phases per symbol is used. In addition, each phase is shown by using #0 to #7. As shown in FIG. 3, jitter components 81a and 81b show jitter components of synchronous words for every frame; the reference numerals 82a and 82b show jitter components in which these jitter components 81a and 81b are added together, respectively. Since the jitter components of the data area cannot be detected, the jitter components of the synchronous word as for the multiple frames are added; thus, the jitter components of the entire frame is guessed, and the optimum phase for sampling can be determined.

In order to implement this, in the synchronous circuit 11, the detection result of the synchronous word is added in the counter 310. Based on the added result, the determinating unit 320 recognizes jitter components of the symbol boundary in the multiple frames, and determines the optimum phase for sampling. The optimum phase is the phase in which there is little jitter components, i.e., the phase that is expected that the phase is far from the symbol boundary and the synchronous word can be detected every time. For example, in FIG. 3, it corresponds to the phase #4 indicated by an arrow 83.

Subsequently, an operation example of the synchronous circuit shown in FIG. 2 will be specifically explained by using timing charts. Here, the synchronous circuit 11 will be explained by using the case where the number of times that coincidence with the expected value is not detected is accumulated (i.e., added up). The counter 310 uses signals outputted from the synchronous-word detecting unit 20, and using the inversion theory, counts up the count of the phases in which the coincidence with the expected value is not detected.

Figure 4:
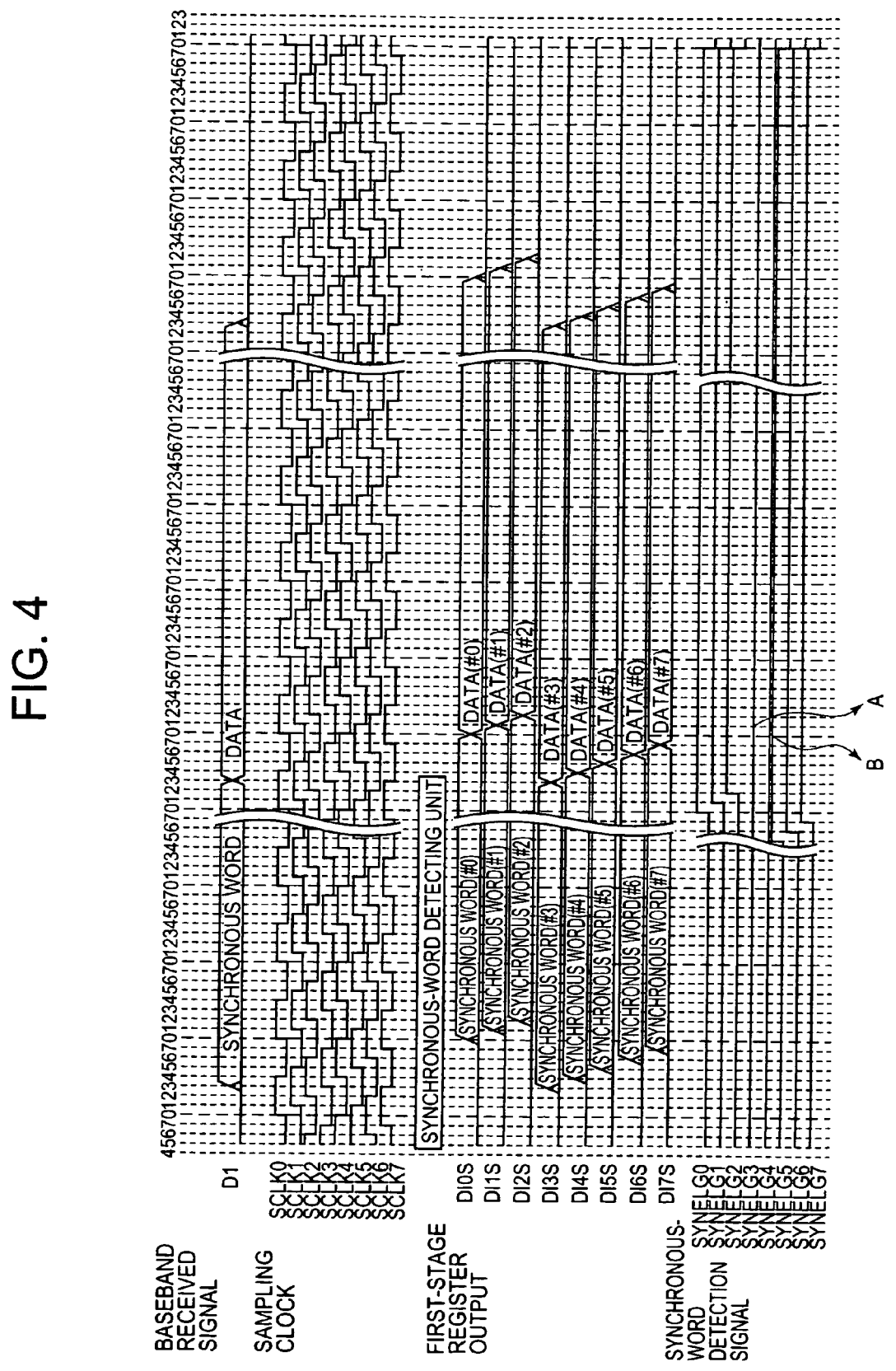
Figure 5:
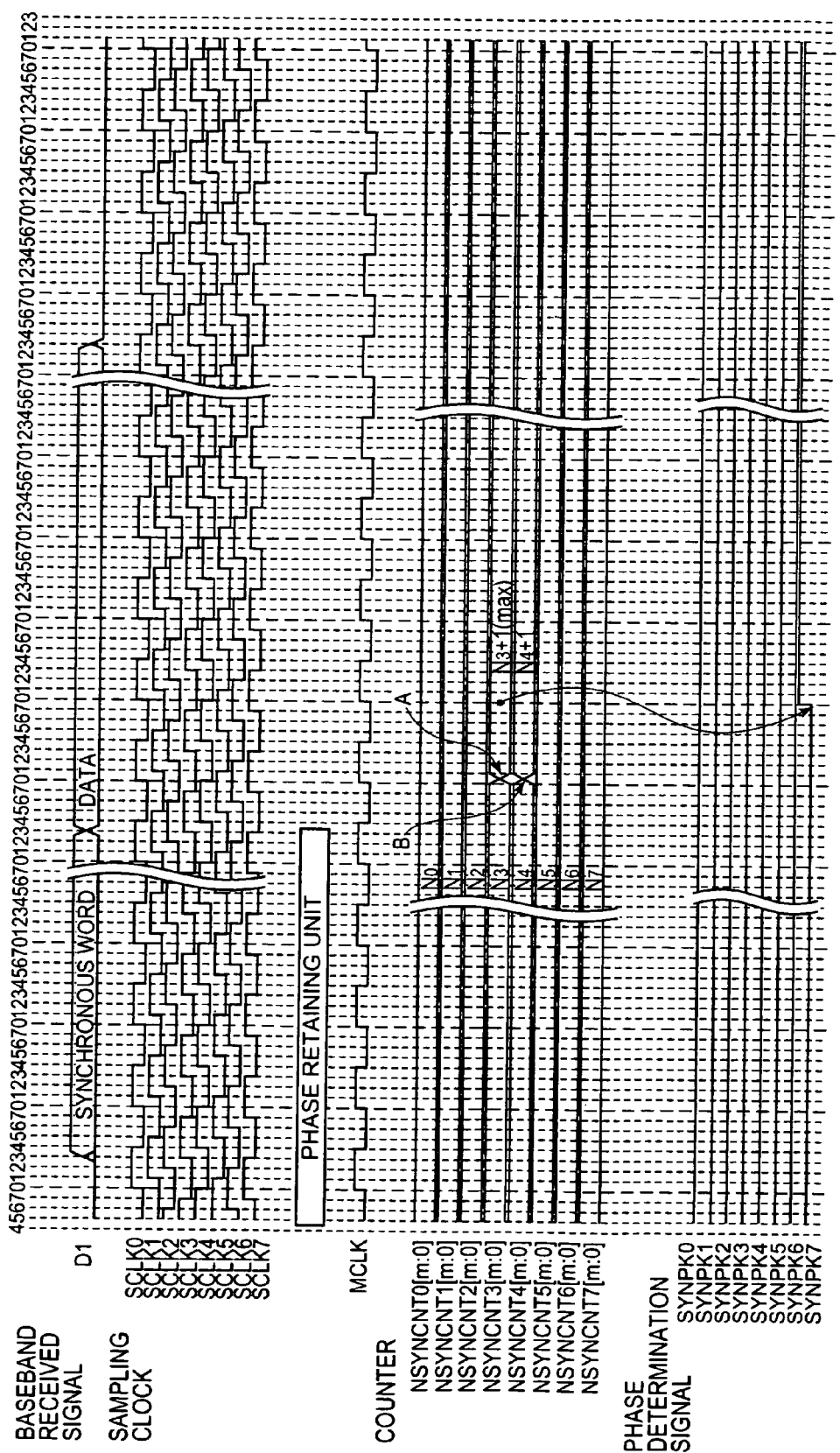
FIG. 5 is a timing chart showing an example of operation of the phase information retention unit of the synchronous circuit in the case of counting up the count of the phase in which coincidence with the expected value is not detected.
Figure 6:
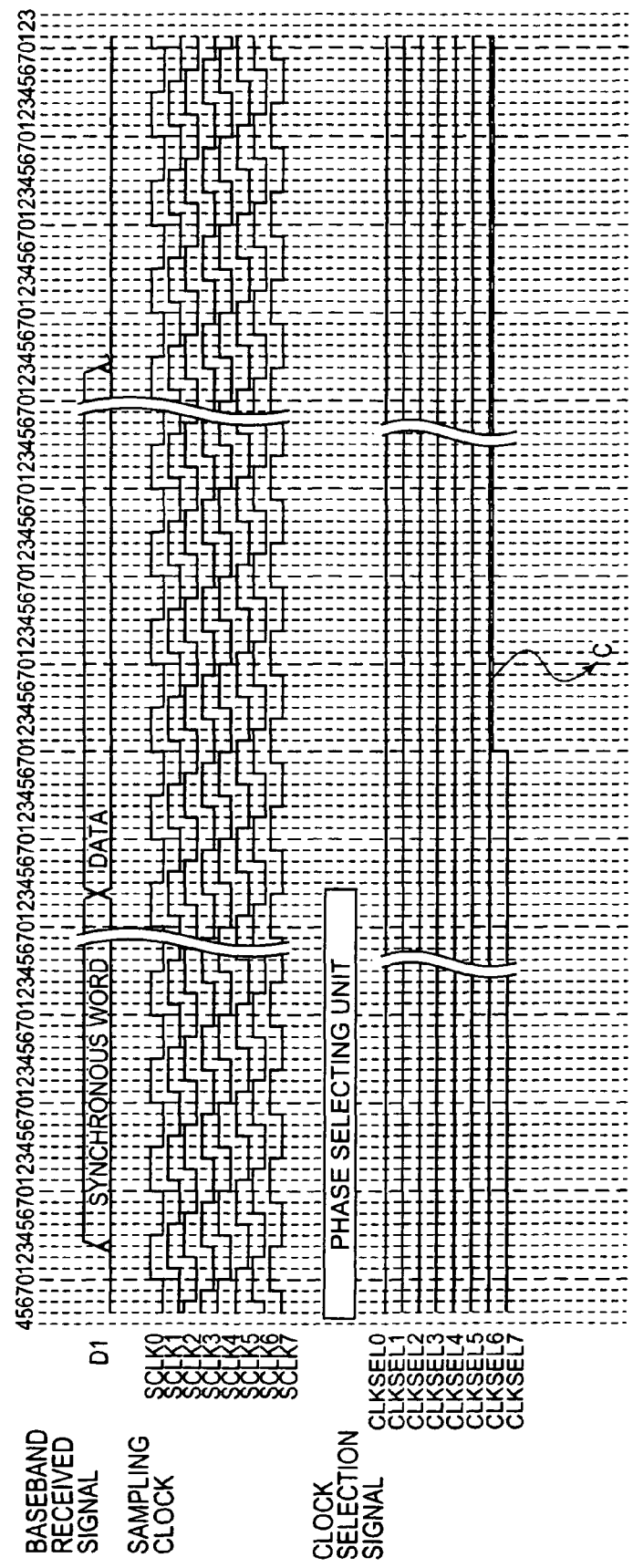
FIG. 6 is a timing chart showing an example of operation of a phase selecting unit of the synchronous circuit in the case of counting up the count of the phase in which coincidence with the expected value is not detected.

FIGS. 4 to 7 are timing charts showing operation examples of the synchronous circuits in the case of counting up the count of the phases in which the coincidence with the expected value is not detected. Operations of components are shown as follows: FIG. 4 shows a synchronous-word detecting unit 20; FIG. 5, a phase information retaining unit 30; FIG. 6, a phase selecting unit 40; and FIG. 7, a FIFO buffer 50. Baseband received signals DI include synchronous word and data. Sampling clocks (SCLK0 to SCLK7) are considered to be 8 phases of #0 to #7 per symbol. In the figures, a turn of the sampling clock is shown by repetition of the numerical value of 0 to 7 at the top. In addition, in FIGS. 4 to 7, the reference numerals A to C show the arrows relating the signals among the multiple figures. Therefore, the arrows A to C show a relationship between the signals among the components.

Firstly, as shown in FIG. 4, the synchronous-word detecting unit 20 takes in the synchronous word and the data from the baseband received signal D1 to a first register output at a timing of sampling of the phases. The synchronous-word detecting unit 20 detects the coincidence between the synchronous word and the expected word on the basis of the expected value. The synchronous-word detecting unit 20 then outputs synchronous-word detection signals SYNFLG0 to SYNFLG7. In FIG. 4, the coincidence with the expected value is not detected in the phases of #3 and #4, and thereby the rising edge of the signal cannot be found. In other words, it can be assumed that the coincidence with the expected value is not detected because the symbol boundary exists in the vicinity of SCLK3 and SCLK4.

Next, a phase information retaining unit 30 will be described with reference to FIG. 5. The counter 310 counts up the counter of the phases #3 and #4 in which the coincidence with the expected value is not detected. In FIG. 5, the counters of the phases of #3 and #4 NSYNCNT3 and NSYNCNT4 are counted up with a timing shown by the arrows A and B. Thus, in the case of the synchronous-word detection signal SYNFLGx (X=0 to 7, hereinafter, the value of X is considered as the same)=Low, it is counted up as being considered that the coincidence with the expected value is not detected. Then, the determinating unit 320 determines the phase to be sampled on the basis of the value of the counter. The method for determining the phase is as described above. Here, the operations of a first method and a second method will be described, when the coincidence with the expected value is not detected.

As for the determinating unit 320, at first, a value of the counter 310 extracts a phase of zero. Usually, because there are multiple phases whose counters are zero, the determinating unit 320 determines the phase by using at least either one of the first method or the second method described above. The determinating unit 320 determines, as the phase to be sampled, the central phase among the multiple phases in which the counter values are zero (the first method). In addition, when central phases exist in plurality, the phase selected here is a phase which is remote from the phase with the greatest value of the counter 310, i.e., the phase having a large number of times that the coincidence with the expected value is not detected (the second method). Alternatively, the determinating unit 320 selects the phase remote from phase having the largest value of the counter 310 (particularly, the farthest phase) among the phases in which a value of the counter 310 is zero.

To be specific, in FIG. 5, in the case of combining the first method and the second method, the determinating unit 320 is determined in the following way. Here in the phases other than the phases #3 and #4, when a value of the counter 310 is zero and the largest value of the counter 310 is in the phase #3, the determinating unit 320 extracts the phases #0 and #7 at the center of the phases to be sampled from the phases other than the phases #3 and #4 (the first method). Then, the determinating unit 320 determines the phase #7 of the phases #0 and #7, the farthest from the NSYNCNT3, whose counter value is the largest, as the phase to be sampled (the second method).

The phase with largest number of counts is most likely to obtain the symbol boundary. Therefore, it is considered that the phase has the highest risk to retain the incorrect data. On this account, the phase remote from the phase with the largest value of the counter 310 is preferably determined as the phase to be sampled. In this manner, the determinating unit 320 outputs the phase determined #7 among the phase determination signals SYNPK0 to SYNPK7, to the phase selecting unit 40, setting the phase #7 determined to be SYNPK7=High, on the basis of the determination result.

Next, the phase selecting unit 40 will be described with reference to FIG. 6. The phase selecting unit 40 inputs the synchronous-word detection signals SYNFLG0 to SYN-FLG7 from the synchronous-word detecting unit 20, and then inputs the phase determination signals SYNPK0 to SYNPK7 from the determinating unit. When a phase determined in the determinating unit 320 exists among the phase determination signals SYNPK0 to SYNPK7, the phase selecting unit 40 selects the phase determined as the phase to be determined. Here in FIG. 5, the determinating unit 320 sets the SYNPK7 to High. Therefore, the phase selecting unit 40 selects the phase of #7 as the phase to be sampled. The phase selecting unit 40 sets a CLKSEL7 of the phase to be sampled, which is selected, to High, and then outputs CLKSEL0 to CLKSEL7 to the FIFO buffer 50, as shown in FIG. 6.

On the other hand, when no phase determined by the determinating unit 320 exists, i.e., when all of the phase determination signals SYNPLx are Low, the phase selecting unit 40 selects the phase to be sampled on the basis of SYNFLGx. In this case, a method similar to the conventional one is used. For example, a phase to be sampled is selected by the conventional method in such a case where the determinating unit 320 cannot perform determination, since the detected results of the multiple frames are not counted and there is not enough phase information (or there is little phase information).

In addition, the phase selecting unit 40 may employ a method for calculating a safe phase (i.e., the phase which has little jitter components) on the basis of information obtained from the phase determination signals, when the indeed appropriate phase cannot be determined only with the synchronous-word detection signals from the synchronous-word detecting unit 20.

Figure 7:
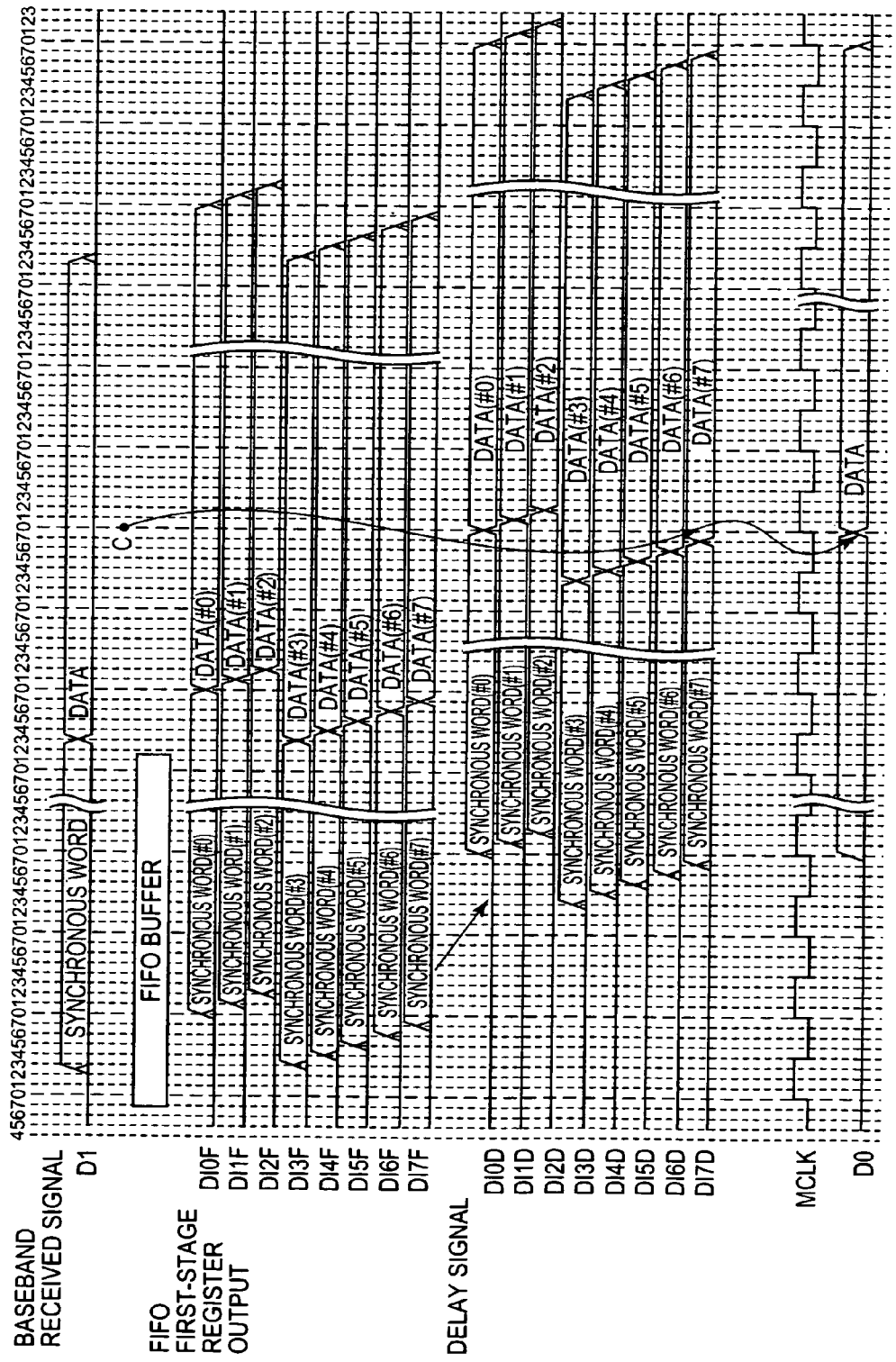
FIG. 7 is a timing chart showing an example of operation of a FIFO buffer of the synchronous circuit in the case of counting up the count of the phase in which coincidence with the expected value is not detected.
Figure 8:
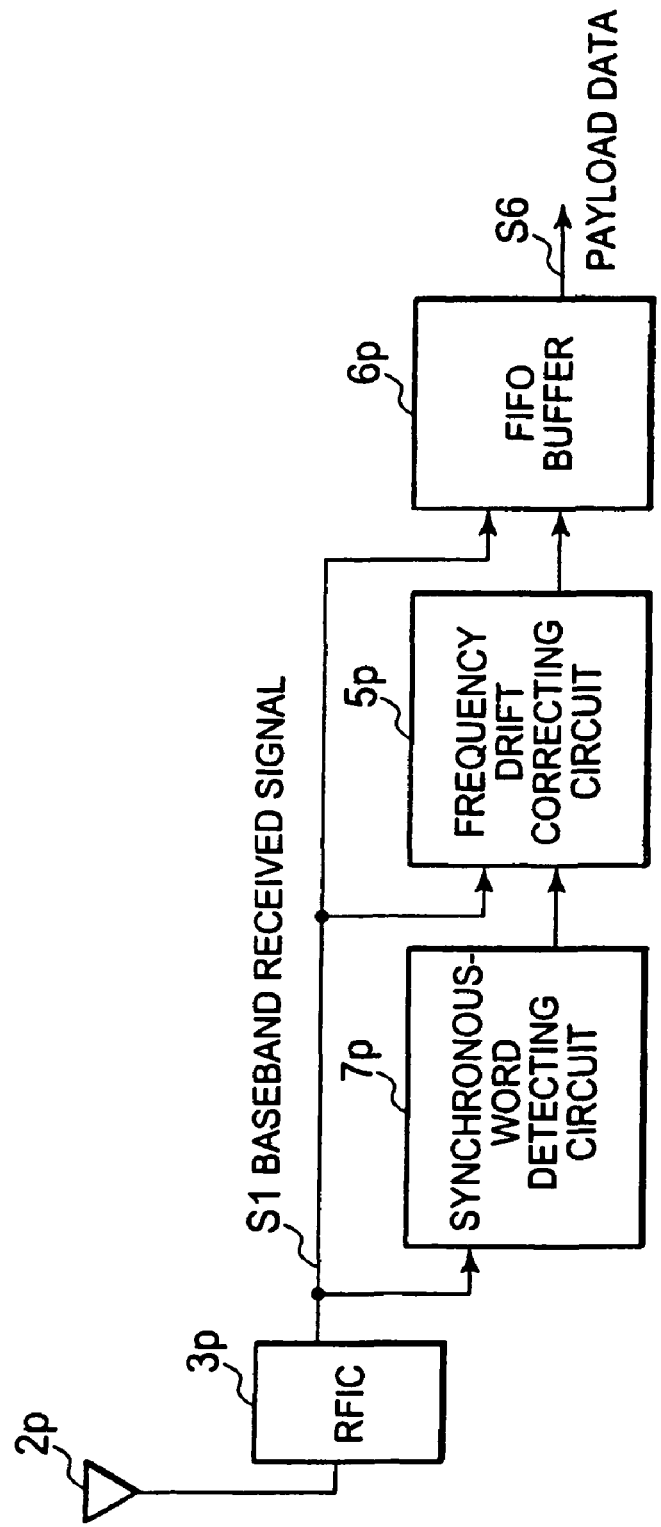
FIG. 8 is a schematic block diagram showing a configuration example of the conventional synchronous circuit.

Subsequently, the FIFO buffer 50 will be described with reference to FIG. 7. The FIFO buffer 50 takes in the synchronous word and the data to a FIFO first register outputs DI0F to DI7F from the baseband received signal DI, at the timings of samplings of each phase. Then, the FIFO buffer 50 delays output of the data retained in the FIFO first register outputs DI0F to DI7F, and then outputs the delayed data as the delayed signals DI0D to DI7D. This means that the FIFO buffer 50 inserts the delays of the multiple clocks to wait for the completion of the clock selection logical operation, i.e., to delay the output of the data until the phase selecting unit 40 selects the phase to be sampled. Then, the FIFO buffer 50 mounts the data of the phase #7 on the master clock (MCLK) in accordance with the clock selection signals CLKSEL0 to CLKSEL7.

As described above, in the present embodiment, an appropriate phase is selected not only in a portion of the synchronous word but also across the entire frames, based on the result detected of the coincidence between the synchronous word and the expected value in a long span among the multiple frames. Therefore, even when the appropriate phase cannot be detected in the entire frame only by means of the synchronous word added to a header of one frame, it is expected that an appropriate phase can be obtained in the entire frames by accumulating the detected result of the synchronous word of the multiple frames.

Other Embodiments

In the Embodiment 1, as a specific example, described is an embodiment in which the number of times that non-coincidence between the synchronous word and the expected value is counted. However, the counter may be a counter to count the number of times that coincidence with the expected value is detected. Hereinafter, an embodiment will be described in which the counter 310 counts the number of times that the coincidence between the synchronous word and the expected value is detected. The synchronous circuit 11 in the same manner as FIG. 2 can be used. The function of the phase information retaining unit 30 is different from that of the Embodiment 1. The counter 310 counts a case where the coincidence between the synchronous word and the expected value is detected. Therefore, the counter 310 is counted up when the synchronous-word detection signals is High.

In addition, the determinating unit 320 determines as the following description by using a value of the counter. First, the determinating unit 320 extracts a phase to be sampled from the phases in which the value of the counter is the largest. The phase having the largest value of the counter represents the phase having the largest number of times that coincidence is detected, as for a comparison of the synchronous word and the expected value. Since such phases usually exist in plurality, the determinating unit 320 determines the phase to be sampled by using at least either one of the first method or the second method described in the Embodiment 1.

The determinating unit 320 determines, as a phase to be sampled, a central phase among multiple phases whose value of the counter 310 is the largest (a first method). In addition, when multiple central phases exist, the smallest value of the counter 310 is selected; in other words, selected is a phase which is remote from a phase having a large number of times that the coincidence with the expected value is not detected (a second method). Alternatively, the determinating unit 320 selects the phase remote from a phase (particularly the farthest phase) having the smallest value of the counter 310 among phases in which the value of the counter 310 is the largest (the second method). Thus, the determinating unit 320 determines the phase to be sampled.

In this manner, unlike the Embodiment 1 described above, even when the phase information is information accumulating the detected result of the synchronous word, an appropriate phase can be selected in the entire frame on the basis of the result in which the coincidence between the synchronous word and the expected word is detected in a long span across the multiple frames.

In addition, in the embodiments above, the phase selecting unit 40 selects the phase to be sampled, based on the result determined which the phase information retaining unit 30 outputs. However, the phase selecting unit 40 may perform the function of the determinating unit 320. To be concrete, the phase information retaining unit 30 outputs retaining phase information to the phase selecting unit 40; then, the phase selecting unit 40 determines the phase to be sampled on the basis of the phase information. In addition, in the embodiments above, the phase detected with the largest number of coincidence is considered as a normal phase, in a comparison of the synchronous word with the expected value in the multiple frames. However, a phase to be sampled may be determined, considering a phase detected by the synchronous word in the predetermined number of frames as the normal phase.

The present invention may be applied for micro computers using the communication among the LSIs in which the same clocks are referred to and transmission and reception of data are performed in a synchronized manner. To be concrete, it is preferable that such application of the present invention should be focused on the communication standard in which the synchronous word is located in a state of being fixed at the header of a frame, and be introduced into these communication devices. For example, the present invention is expected to be introduced into communication devices with the authority of standards, such as DigRf for a mobile telephone.

As described above, in accordance with the preferred embodiments of the present invention, the phase information retaining unit retains phase information in which the detected results of synchronous words are accumulated for the multiple frames. Then, the phase information retaining unit outputs, to the phase selecting unit, a phase determined on the basis of a result from sampling for a long time or the result from sampling for a long time. In this way, the phase selecting unit selects the phase to be sampled on the basis of the result from sampling for a long time. Thus, the synchronous circuit can improve accuracy of the sampling phase. This leads to select more appropriate phase to be sampled even in the case where a state of propagation channel is changing, as compared to the case where synchronous operation is performed every frames which is received. Therefore, it is expected to reduce the bit error rate. In particular, it is considered that an effect of the present invention will be great, in the case where synchronous words included in a frame are less than data in comparison, and where the synchronous words are located in one place of the frame.

Although the invention has been described above in connection with several preferred embodiments thereof, it will be appreciated by those skilled in the art that those embodiments are provided solely for illustrating the invention, and should not be relied upon to construe the appended claims in a limiting sense.

What is claimed is:

1. A synchronous circuit comprising:
    a synchronous-word detecting unit receives a baseband received signal including a synchronous word and data for each frame, and detects whether or not the synchronous word is coincided with an expected value in the baseband received signal by using an N-(N is an integer of 2 or larger) phase sampling clock;
    a phase information retaining unit retains phase information accumulatively including results detected for a plurality of frames by the synchronous-word detecting unit, and determines a phase to be sampled on the basis of the retained phase information;
    a phase selecting unit selects and determines a phase of the sampling clock on the basis of determination by the phase information retaining unit; and
    a FIFO buffer samples the data from the baseband received signal, and outputs the sampled data.

2. The synchronous circuit according to claim 1, wherein the phase information retaining unit retains the phase information for each phase, and determines the phase to be sampled from a normal phase in which the coincidence between the synchronous word and the expected value is detected in the plurality of frames.

3. The synchronous circuit according to claim 2, wherein the phase information retaining unit determines, as a phase to be sampled, a central phase among a plurality of the normal phases.

4. The synchronous circuit according to claim 2, wherein the phase information retaining unit determines, as a phase to be sampled, a phase remote from a defective phase in which the coincidence between the synchronous word and the expected value is not detected in a large number of frames.

5. The synchronous circuit according to claim 1 further comprising:
    a counter counts a case where the synchronous word is not detected for each phase, on the basis of the result detected by the synchronous-word detecting unit; and
    a determinating unit determines a phase to be sampled from a phase where the value of the counter is zero.

6. The synchronous circuit according to claim 5, wherein the determinating unit determines, as a phase to be sampled, a central phase among a plurality of phases where the value of the counter is zero.

7. The synchronous circuit according to claim 5, wherein the determinating unit determines, as a phase to be sampled, a phase remote from the phase having the greatest value of the counter.

8. The synchronous circuit according to claim 1, comprising:
    a counter counts a case where the coincidence between the synchronous word and the expected value is detected for each phase, on the basis of the result detected by the synchronous-word detecting unit; and
    a determinating unit which determines a phase to be sampled from a phase where the value of the counter is greatest.

9. The synchronous circuit according to claim 8, wherein the determinating unit determines, as the phase to be sampled, a central phase among a plurality of phases having the greatest value of the counter.

10. The synchronous circuit according to claim 8, wherein the determinating unit determines, as a phase to be sampled, a phase remote from the phase having the least value of the counter.

11. The synchronous circuit according to claim 1, wherein the phase selecting unit further determines a phase to be sampled on the basis of a result detected by the synchronous-word detecting unit.

12. A method for receiving data comprising:
    receiving a baseband received signal including a synchronous word and data for each frame;
    detecting whether or not a synchronous is coincided with an expected value in the baseband received signal by using an N-(N is an integer of 2 or larger) phase sampling clock;
    retaining, in a recording area, phase information accumulatively including results detected for a plurality of frames;
    selecting a phase to be sampled on the basis of the retained phase information; and
    sampling the data from the baseband received signal at the selected phase, and outputting the sampled data.

* * * * *